(12) United States Patent
Moore

(10) Patent No.: US 11,524,523 B2
(45) Date of Patent: Dec. 13, 2022

(54) OMNI-WHEEL BRAKE DEVICES AND METHODS FOR BRAKING AN OMNI-WHEEL

(71) Applicant: Toyota Motor North America, Inc., Plano, TX (US)

(72) Inventor: Douglas A. Moore, Fairview, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 653 days.

(21) Appl. No.: 16/667,389

(22) Filed: Oct. 29, 2019

(65) Prior Publication Data

US 2020/0391546 A1 Dec. 17, 2020

Related U.S. Application Data

(60) Provisional application No. 62/860,495, filed on Jun. 12, 2019.

(51) Int. Cl.
*B60B 19/00* (2006.01)
*B60B 19/12* (2006.01)
(Continued)

(52) U.S. Cl.
CPC ............ *B60B 19/003* (2013.01); *B60B 19/12* (2013.01); *B60T 1/04* (2013.01); *F16D 49/00* (2013.01); *F16D 49/04* (2013.01); *F16D 49/14* (2013.01); *F16D 49/16* (2013.01); *F16D 51/00* (2013.01); *F16D 65/16* (2013.01); *B60B 27/0047* (2013.01); *B60B 2900/351* (2013.01);
(Continued)

(58) Field of Classification Search
CPC . B60B 19/003; B60B 9/12; B60T 1/04; F16D 49/00; F16D 51/00; F16D 65/16
See application file for complete search history.

(56) References Cited

U.S. PATENT DOCUMENTS

2008/0018167 A1 1/2008 Fuji
2010/0243342 A1 9/2010 Wu et al.
(Continued)

FOREIGN PATENT DOCUMENTS

CN 106427388 A * 2/2017 ............. B60B 19/12
GB 2408692 A 6/2005
(Continued)

*Primary Examiner* — Melanie Torres Williams
(74) *Attorney, Agent, or Firm* — Dinsmore & Shohl LLP

(57) ABSTRACT

An omni-wheel may include a shaft, a plurality of rollers, and a braking device. The plurality of rollers may be circumferentially arranged about the shaft and arranged radially outward from the shaft. The braking device may include an at least one flexible clutch member, an at least one brake pad, and an actuator. The at least one flexible clutch member may have an outer diameter arranged about the shaft. The at least one brake pad may be arranged on the outer diameter of the at least one flexible clutch member. The actuator may be arranged to axially displace the at least one flexible clutch member. The at least one flexible clutch member may expand radially outward when axially displaced by the actuator, which may displace the at least one brake pad arranged on the outer diameter of the at least one flexible clutch member radially outward to contact at least one of the plurality of rollers, preventing rotation of the roller.

20 Claims, 5 Drawing Sheets

(51) Int. Cl.
*B60T 1/04* (2006.01)
*F16D 49/00* (2006.01)
*F16D 65/16* (2006.01)
*F16D 49/16* (2006.01)
*F16D 49/14* (2006.01)
*F16D 49/04* (2006.01)
*F16D 51/00* (2006.01)
*B60B 27/00* (2006.01)
*F16D 121/14* (2012.01)
*F16D 125/60* (2012.01)
*F16D 125/68* (2012.01)
*F16D 121/08* (2012.01)

(52) U.S. Cl.
CPC ...... *F16D 2121/08* (2013.01); *F16D 2121/14* (2013.01); *F16D 2125/60* (2013.01); *F16D 2125/68* (2013.01)

(56) References Cited

U.S. PATENT DOCUMENTS

2016/0121709 A1   5/2016   Shin
2018/0050563 A1   2/2018   Zhang et al.

FOREIGN PATENT DOCUMENTS

| | | | | |
|---|---|---|---|---|
| JP | 3820239 B2 | | 9/2006 | |
| JP | 2007106254 A | * | 4/2007 | ......... A61H 15/0092 |
| JP | 2008265685 A | * | 11/2008 | ............. A01D 34/44 |
| JP | 2018134892 A | * | 8/2018 | ............... A61G 5/02 |
| WO | 2011041915 A1 | | 4/2011 | |
| WO | 2011113562 A2 | | 9/2011 | |
| WO | WO-2015197198 A2 | * | 12/2015 | ........... B60B 19/003 |

* cited by examiner

OMNI-WHEEL BRAKE DEVICES AND METHODS FOR BRAKING AN OMNI-WHEEL

CROSS-REFERENCE TO RELATED APPLICATIONS

This application claims the benefit of U.S. Provisional Application No. 62/860,495, filed Jun. 12, 2019, the entire contents of which is incorporated by reference in its entirety.

TECHNICAL FIELD

The present specification generally relates to omni-wheel brake devices and methods for braking an omni-wheel and, more specifically, to omni-wheel brake devices and methods for braking an omni-wheel which utilize a flexible clutch member.

BACKGROUND

Omni-wheels are wheels with rollers around the circumference that are perpendicular to the circumferential direction. This allows an omni-wheel to operate as a traditional wheel, which would be rolled in the circumferential direction of the wheel (i.e., the longitudinal direction). Additionally, an omni-wheel not only rolls in the circumferential direction, but can also be rolled along its rollers touching the ground perpendicular to the circumferential direction (i.e., the lateral direction). This allows for an increase in maneuverability when compared to traditional wheels. However, current omni-wheels may not include braking mechanisms which can brake the rollers of the omni-wheel to prevent rotation. Additionally, current braking mechanism may only be capable of braking all of the rollers simultaneously, or none of the rollers.

Accordingly, there is a need for alternative omni-wheel braking devices and methods that can brake the rollers of omni-wheels to prevent lateral movement, while also allowing for selective engagement of the rollers of omni-wheels.

SUMMARY

According to a first aspect, an omni-wheel may include a shaft, a plurality of rollers, and a braking device. The plurality of rollers is circumferentially arranged about the shaft and arranged radially outward from the shaft. The braking device includes an at least one flexible clutch member, an at least one brake pad, and an actuator. The at least one flexible clutch member is arranged about the shaft and may have an outer diameter. The at least one brake pad is arranged on the outer diameter of the flexible clutch member. The actuator is arranged to axially displace the flexible clutch member. The flexible clutch member expands radially outward when axially displaced by the actuator, which displaces the at least one brake pad arranged on the outer diameter of the flexible clutch member radially outward to contact at least one of the plurality of rollers, preventing rotation of the roller.

According to a second aspect, an omni-wheel according to the previous aspect, the at least one brake pad is secured to the at least one flexible clutch member.

According to a third aspect, an omni-wheel according to any of the previous aspects, wherein the at least one brake pad is integral with the at least one flexible clutch member.

According to a fourth aspect, an omni-wheel according to any of the previous aspects, wherein the at least one brake pad is biased radially inward to disengage the at least one roller when the at least one flexible clutch member is not axially displaced.

According to a fifth aspect, an omni-wheel according to any of the previous aspects, wherein the actuator further includes a collar arranged on the shaft of the omni-wheel.

According to a sixth aspect, an omni-wheel according to any of the previous aspects, wherein the at least one flexible clutch member is arranged within a channel formed on the shaft of the omni-wheel.

According to a seventh aspect, an omni-wheel according to any of the previous aspects, wherein the at least one brake pad contacts an axle of the least one of the plurality of rollers According to an eighth aspect, an omni-wheel according to any of the previous aspects, wherein the at least one brake pad only prevents rotation of the roller contacting the ground.

According to a ninth aspect, a braking device for an omni-wheel includes a flexible clutch member, a brake pad, and an actuator. The flexible clutch member is arranged about a shaft of an omni-wheel, where the flexible clutch member is radially aligned with a roller of the omni-wheel. The brake pad is arranged on the flexible clutch member. The actuator is arranged to axially displace the flexible clutch member. The flexible clutch member expands radially outward when axially displaced by the actuator, displacing the brake pad arranged on the flexible clutch member radially outward to contact the roller, preventing rotation of the roller.

According to a tenth aspect, a braking device for an omni-wheel according to any of the previous aspects, wherein the brake pad is secured to the flexible clutch member.

According to an eleventh aspect, a braking device for an omni-wheel according to any of the previous aspects, wherein the brake pad is integral with the flexible clutch member.

According to a twelfth aspect, a braking device for an omni-wheel according to any of the previous aspects, wherein the brake pad is biased radially inward to disengage the roller when the flexible clutch member is axially displaced.

According to a thirteenth aspect, a braking device for an omni-wheel according to any of the previous aspects, wherein the actuator further includes a collar arranged on a shaft of the omni-wheel.

According to a fourteenth aspect, a braking device for an omni-wheel according to any of the previous aspects, wherein the flexible clutch member is arranged within a channel formed within the shaft of the omni-wheel.

According to a fifteenth aspect, a method of braking an omni-wheel includes axially displacing a flexible clutch member arranged within a hub of the omni-wheel in a first axial direction. The flexible clutch member is expanded radially outward. A brake pad arranged within the hub is displaced radially outward. An at least one roller of the omni-wheel is contacted with the brake pad. Rotation of the roller is prevented due to the contact between the brake pad and the roller.

According to a sixteenth aspect, a method of braking an omni-wheel according to any of the previous aspects, wherein the at least one roller of the omni-wheel is prevented from rotating only when contacting the ground.

According to a seventeenth aspect, a method of braking an omni-wheel according to any of the previous aspects, wherein the brake pad is integral with an outer diameter of the flexible clutch member.

According to an eighteenth aspect, a method of braking an omni-wheel according to any of the previous aspects, wherein the flexible clutch member is arranged within a channel formed within a shaft of the omni-wheel.

According to a nineteenth aspect, a method of braking an omni-wheel according to any of the previous aspects, further including axially displacing a flexible clutch member arranged within a hub of the omni-wheel in a second axial direction, retracting the flexible clutch member radially inward, displacing the brake pad arranged within the hub radially inward, and disengaging the brake pad with the at least one roller of the omni-wheel.

According to a twentieth aspect, a method of braking an omni-wheel according to any of the previous aspects, wherein the brake pad is biased radially inward to disengage the at least one roller when flexible clutch member is axially displaced in the second axial direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

An omni-wheel having a braking device is disclosed herein. Omni-wheels allow for both longitudinal and lateral movement of a vehicle equipped with the omni-wheels, without having to turn the wheels. Additionally, by being able to selectively brake the rollers of an omni-wheel, the transition between longitudinal movement and lateral movement can be seamless, while also occurring simultaneously.

Figure 1:
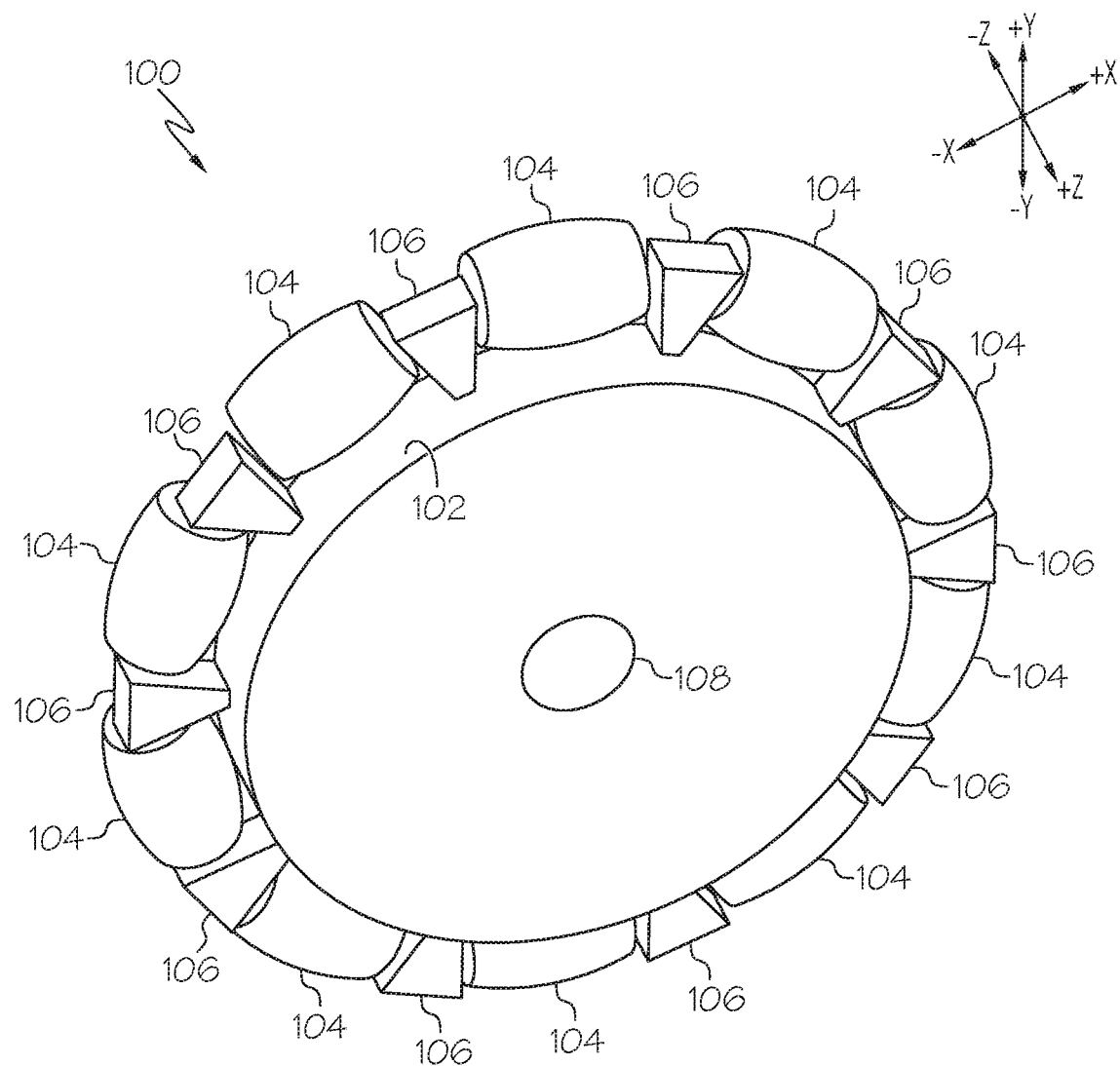
FIG. 1 schematically depicts an example omni-wheel, according to one or more embodiments shown or described herein.

FIG. 1 generally depicts an embodiment of an omni-wheel having a braking device arranged within the hub of the omni-wheel. The braking device may include at least one flexible clutch member, at least one brake pad, and an actuator. The flexible clutch member may expand radially outward when axially displaced by the actuator, which may displace the at least one brake pad radially outward to contact at least one of the plurality of rollers, preventing rotation of the roller. Various embodiments of the braking device for omni-wheels will be described in greater detail herein.

As used herein, the term "longitudinal direction" refers to the forward-rearward direction (i.e., in the +/−X-direction of the depicted coordinate axes). The term "lateral direction" refers to the cross-vehicle direction of the (i.e., in the +/−Z-direction of the depicted coordinate axes), and is transverse to the longitudinal direction. The term "vertical direction" refers to the upward-downward direction (i.e., in the +/−Y-direction of the depicted coordinate axes). As used herein, "upper" and "above" are defined as the positive Y direction of the coordinate axis shown in the drawings. "Lower" and "below" are defined as the negative Y direction of the coordinate axis shown in the drawings. Further, the terms "outboard" as used herein refers to the relative location of a component with respect to a centerline. The term "inboard" as used herein refers to the relative location of a component with respect to the centerline. Because the structures may be generally symmetrical about a centerline, the direction to which use of terms "inboard" or "outboard" and refer may be mirrored about the centerline when evaluating components positioned along opposite sides.

Referring now to FIG. 1, an example omni-wheel 100 is generally depicted. As illustrated, the omni-wheel 100 may include a hub 102, a plurality of rollers 104, a plurality of roller mounts 106, and a shaft 108. As will be described in greater detail herein, the arrangement of the roller 104 on the outer circumference of the omni-wheel 100 allows for the omni-wheel to be translated in both the longitudinal and lateral directions without having to turn the omni-wheel 100. The rollers 104 of the omni-wheel 100 are separately rotatable from one another. It is noted that the present omni-wheel 100 may be used to move any type of device without limitation, including terrestrial vehicles, wheel chairs, carts, robots, etc. The omni-wheel 100 may be non-rotatably coupled to the shaft 108 to allow power to be transferred down the shaft 108 to the omni-wheel 100.

Figure 2:
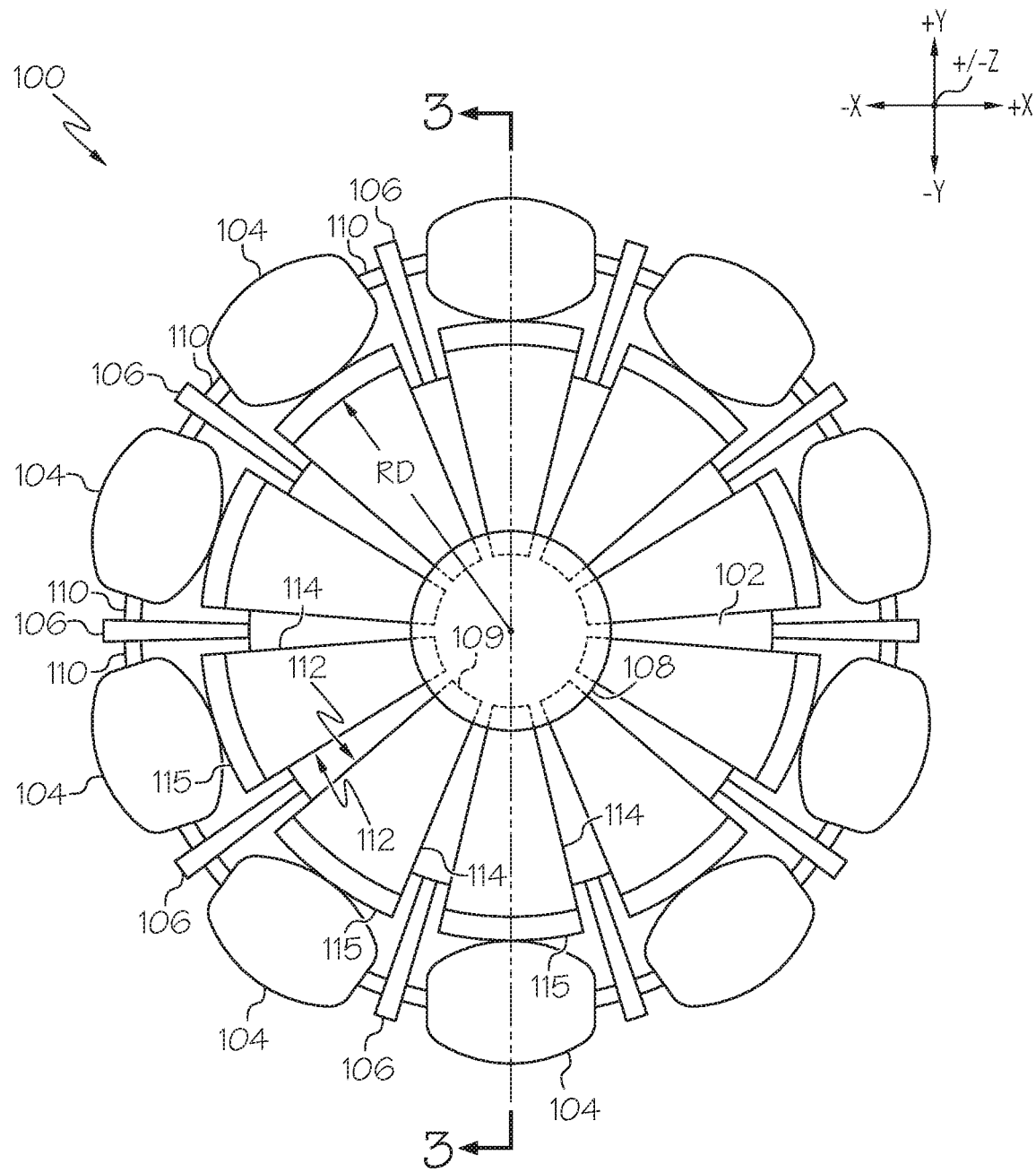
FIG. 2 schematically depicts the omni-wheel of FIG. 1 as viewed along the Z-axis of the depicted coordinate axes, according to one or more embodiments shown or described herein.

Referring now to FIG. 2, the omni-wheel 100 of FIG. 1 is depicted with a front portion of the hub 102 removed. The omni-wheel 100 may include a plurality of braking devices 112, with each braking device 112 including a flexible clutch member 114 and a brake pad 115. The plurality of flexible clutch members 114 and brake pads 115 may be arranged concentrically about the shaft 108 of the omni-wheel 100. The flexible clutch members 114 may be arranged within a plurality of channels 109 arranged within the shaft 108.

Still referring to FIG. 2, the rollers 104 may be barrel-shaped, cylindrical, frusto-conical, or the like. The rollers 104 may be arranged on the outer circumference of the hub 102 to contact the ground in either the longitudinal or lateral direction of travel. The rollers 104 are rotatably connected to the roller mounts 106 by a plurality of axles 110. A single axle 110 may pass completely through a roller 104 and secure the roller 104 to the roller mounts 106 arranged adjacent to the roller 104. Additionally, in a non-limiting example, two (2) separate axles 110 may be used on either side of a roller 104 to secure the roller 104 to the adjacent roller mounts 106. The roller 104 may be manufactured of a hard rubber material, but other suitable materials may be used. The rollers 104 are arranged to ensure a smooth transition between each roller 104 as the omni-wheel 100 travels in the longitudinal direction, rotating in the X-Y plane. The outer surface of the rollers 104 may include grooves or treads which provide additional friction to the rollers 104 when contacting the ground. The rollers 104 may be radially offset from the hub 102 in the radial direction RD.

Referring still to FIG. 2, the plurality of braking devices 112 may each include a flexible clutch member 114 and a brake pad 115. The brake pad 115 is arranged on the outer diameter of the flexible clutch member 114. The brake pad 115 may be an outer portion of the flexible clutch member 114 designated to contact the rollers 104. In some embodiments, the brake pad 115 may be a different material than the flexible clutch member 114, which includes a higher coefficient of friction for contacting the rollers 104 than the flexible clutch member 114. The brake pad 115 may be integral with the flexible clutch member 114, or rigidly attached to the flexible clutch member 114. The flexible clutch member 114 may be formed from a flexible material, such as rubber, plastic, or metal, which can be deformed when a force is applied to the material, but the material will generally hold its shape. The ends of the flexible clutch members 114, that are opposite the brake pads 115, may be arranged within channels 109 formed within the shaft 108.

The amount of braking devices 112 arranged within the omni-wheel 100 may correspond to the amount of rollers 104 arranged on the omni-wheel 100, where each roller 104 has a corresponding flexible clutch member 114 which can selectively brake the roller 104. Additionally, only a single braking device 112 may be used to either brake a single roller, or to brake multiple rollers 104 with a single flexible clutch member 114. For example, the flexible clutch member 114 may be a circular member including relief cuts that allow the circular member to deform when a force is applied. Relief cuts may not be needed if the material which the flexible clutch member 114 is made of is compliant or flexible enough. Additionally, the flexible clutch member 114 may be a partial circular shape, such as a half circle, which interacts with multiple rollers 104 simultaneously. In an engaged, passive state, the flexible clutch members 114 and brake pads 115 are in an extended state to ensure contact with the rollers 104. By contacting the rollers 104 with the brake pads 115, rotation of the rollers 104 in the lateral direction (i.e., Y-Z plane) is prevented. The prevention of rotation of the rollers 104 in the lateral direction may increase maneuverability of the omni-wheel 100 in such a way as to prevent unwanted lateral movement of the omni-wheel 100. In other words, the omni-wheel 100, in an engaged, passive state preventing the rotation of the rollers 104, will function as a traditional wheel, only allowing rotation of the omni-wheel 100 in the longitudinal direction (i.e., X-Y plane) until the braking device 112 is activated to release the brake pad 115 from the outer surface of the roller 104.

Figure 3A:
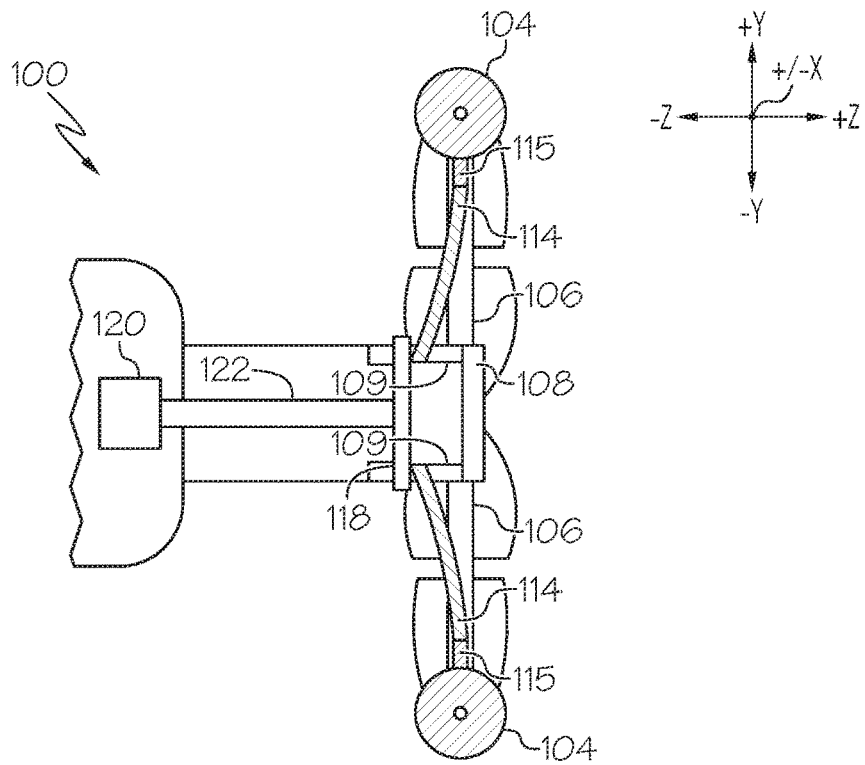
FIG. 3A schematically depicts a cross-sectional view of the omni-wheel of FIG. 2 taken along line 3-3 as viewed along the X-axis of the depicted coordinate axes, according to one or more embodiments shown or described herein.
Figure 3B:
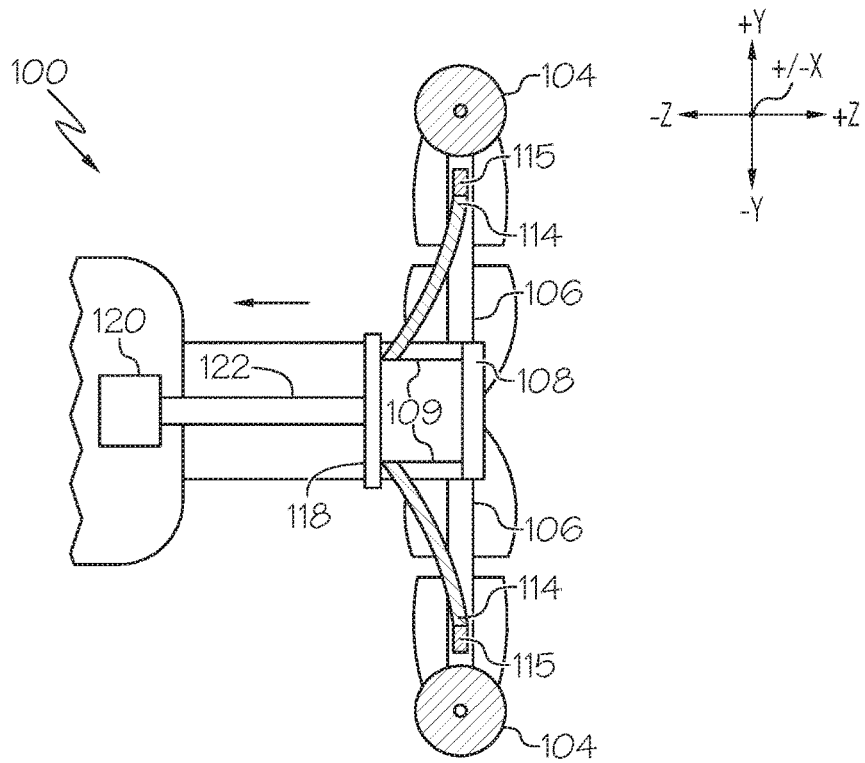
FIG. 3B schematically depicts a cross-sectional view of the omni-wheel of FIG. 2 taken along line 3-3 as viewed along the X-axis of the depicted coordinate axes, according to one or more embodiments shown or described herein.

Referring now to FIGS. 3A and 3B, a cross-sectional view of the omni-wheel 100 taken generally along line 3-3 in FIG. 2 is shown. As noted above, the flexible clutch members 114 and brake pads 115 contact the rollers 104 to prevent lateral movement until the braking devices 112 are disengaged. The braking devices 112 are transitioned between engaged and disengaged states by a collar 118. The collar 118 may be arranged about the shaft 108 and contact a portion of or all of the flexible clutch members 114 resting in the channels 109. The collar 118 may be actuated by an actuator 120, which is secured to the collar 118 by an actuating arm 122. The actuator 120 and actuating arm 122 can be translated in the Z-axis in order to engage or disengage the braking devices 112. The collar 118 may be fixedly secured to the flexible clutch members 114, or the flexible clutch members 114 may be biased in the −Z direction and abut against the collar 118, with the collar 118 keeping the brake pads 115 engaged with the rollers 104. The collar 118 may be rotatably arranged on the shaft 108 to allow the omni-wheel 100 to rotate in the longitudinal direction without the collar 118 rotating with the omni-wheel 100. In some embodiments, the collar 118 may be non-rotatably arranged on the shaft 108, and may rotate with the omni-wheel 100 as the omni-wheel 100 rotates in the longitudinal direction. The actuator 120 and actuating arm 122 may be controlled by a processor or controller (not shown) communicatively coupled to the actuator 120 and actuating arm 122. The processor or controller may also be communicatively coupled to a sensor (not shown) secured to the omni-wheel 100 in order to determine which roller 104 is contacting the ground, in order to activate the actuator 120 and actuating arm 122 to disengage the brake pad 115 from the corresponding roller 104 touching the ground to allow for lateral movement. The sensor may be an angular position sensor which may be non-rotatably secured to the hub 102 or shaft 108, and is calibrated to the angular positions of each roller 104 and flexible clutch member 114.

Referring still to FIG. 3A, the braking device 112 is in an engaged state, where the brake pads 115 are contacting the rollers 104, and the flexible clutch members 114 are biased in the +Z direction by the collar 118. It is noted that the flexible clutch members 114 may extend in both the Y-axis and the Z-axis, and that as the flexible clutch members 114 extend in the −Z direction, the flexible clutch members 114 also retract radially inward along the Y-axis.

Referring still to FIG. 3B, the braking device 112 is in a disengaged state, where the brake pads 115 are not contacting the rollers 104, and the flexible clutch members 114 are retracted radially inward along the Y-axis and biased in the −Z direction by the collar 118. As the collar 118 is actuated by the actuator 120 in the −Z direction, the flexible clutch members 114 are also biased in the −Z direction. Since the brake pads 115 are secured to the flexible clutch members 114, the brake pads 115 also are retracted in the radial direction along the Y-axis. In some embodiments, a gap may form between the rollers 104 and the brake pads 115, as the collar 118 moves in the −Z direction, allowing the rollers 104 to rotate. Additionally, in some embodiments, a gap may not form between the rollers 104 and the brake pads 115. However, the friction force between the rollers 104 and the brake pads 115 may be reduced, which would allow for rotation of the rollers 104 while still in near contact with the brake pads 115. In some embodiments, the brake pads 115 may contact the axles 110, with the rollers 104 being non-rotatably secured to the axles 110.

Still referring to FIGS. 3A and 3B, the actuator 120 may be actuated by a user (not shown), and may be a mechanical, pneumatic, or electrical actuator. As depicted in FIGS. 3A and 3B, the actuator 220 is laterally offset from the hub 102 in the −Z direction and connected to the collar 118 via the actuating arm 122. The actuator 120 and actuating arm 122 may be arranged within the hub 102 of the omni-wheel 100, or the actuator 120 may be directly connected to the collar 118.

Figure 4A:
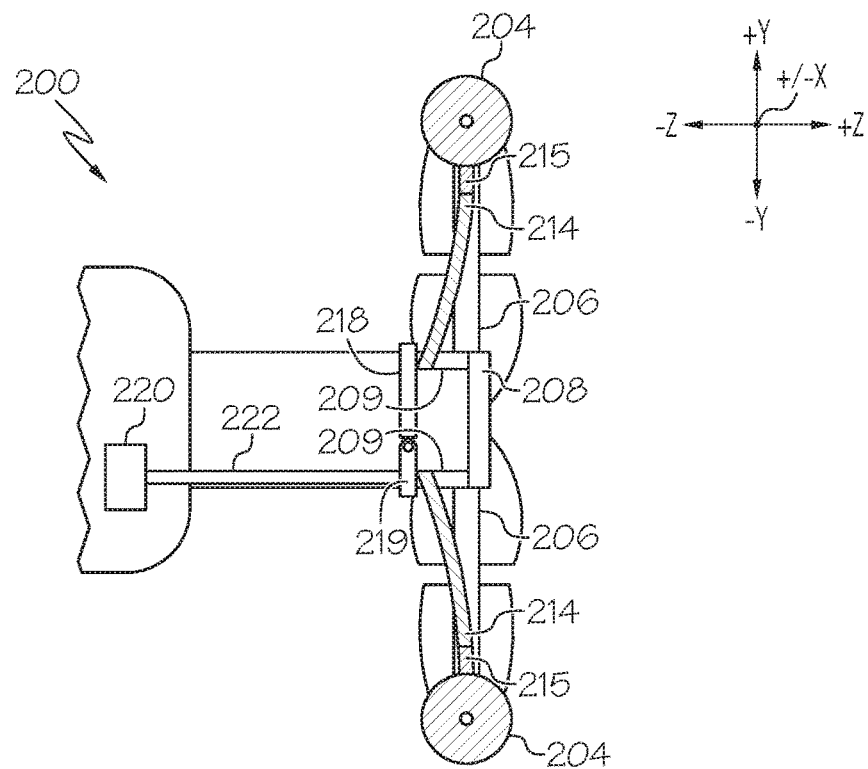
FIG. 4A schematically depicts a cross-sectional view of another example omni-wheel as viewed along the X-axis of the depicted coordinate axes, according to one or more embodiments shown or described herein.
Figure 4B:
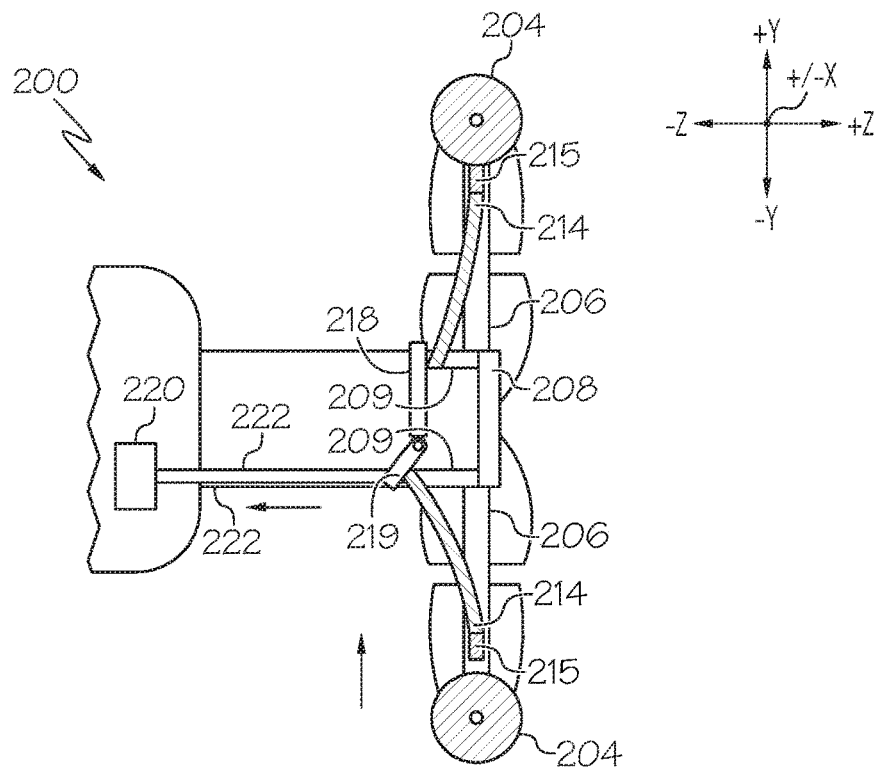
FIG. 4B schematically depicts a cross-sectional view of the omni-wheel of FIG. 4B as viewed along the X-axis of the depicted coordinate axes, according to one or more embodiments shown or described herein.

Referring now to FIGS. 4A and 4B, a cross-sectional view of an omni-wheel 200 is shown. The omni-wheel 200 is substantially similar to the omni-wheel 100, expect for a different collar and actuator arrangement. The omni-wheel 200 generally includes rollers 204, roller mounts 206, shaft 208, flexible clutch members 214, brake pads 215, collar 218, and actuator 220.

As noted above, the flexible clutch members 214 and brake pads 215 contact the rollers 204 to prevent lateral movement until the brake pads 215 are disengaged from the rollers 204. The flexible clutch members 214 are transitioned between engaged and disengaged states by the collar 218. The collar 218 may be arranged about the shaft 208 and contact a portion of or all of the flexible clutch members 214 resting in the channels 209. The collar 218 may include a hinged collar portion 219 which is arranged on the bottom of the shaft 208 (i.e., −Y direction). The collar 218 itself may be secured in an axial position along the Z-axis. In order for the flexible clutch members 214 to actuate in the −Z direction, the hinged collar portion 219 may be pivotally secured to the collar 218, and can be actuated to pivot in the −Z direction. The collar 218 and hinged collar portion 219 may be rotatably arranged on the shaft 208 to allow the omni-wheel 200 to rotate in the longitudinal direction without the collar 218 and hinged collar portion 219 rotating with the omni-wheel 200.

Due to the configuration of the hinged collar portion 219, only the flexible clutch members 214 with corresponding roller(s) 204 contacting the ground will be in a disengaged state, allowing rotation of only the rollers 204 contacting the ground. As the flexible clutch members 214 rotate with the shaft 208 in the X-Y plane, the flexible clutch members 214 abut against the collar 218. As the rollers 204, which were previously not contacting with the ground approach contacting the ground, their corresponding flexible clutch members 214 will transition from abutting the collar 218 and abut against the hinged collar portion 219. In a disengaged state, the hinged collar portion 219 is actuated by the actuator 220 and actuator arm 222 to bias the hinged collar portion 219 in the −Z direction. With the hinged collar portion 219 biased in the −Z direction, the flexible clutch members 214 abutting the hinged collar portion 219 may also be moved in the −Z direction. This movement of the flexible clutch members 214 in the −Z direction disengages the brake pads 215 from the rollers 204, but only for the rollers 204 contacting the ground due to the arrangement of the hinged collar portion 219. Additionally, as the rollers 204 continue to rotate about the omni-wheel 200, the flexible clutch members 214 will abut the retracted hinged collar portion 219. However, as the rollers 204 begin to lose contact with the ground due to their angular position on the omni-wheel 200, the corresponding flexible clutch members 214 will lose contact with the hinged collar portion 219 and abut against the collar 218. By abutting against the collar 218, the flexible clutch members 214 will be biased in the +Z direction, allowing for the brake pads 215 to contact the rollers 204.

Referring still to FIG. 4A, the brake pads 215 are in an engaged state, where the brake pads 215 are contacting the rollers 204, and all the flexible clutch members 214 are biased in the +Z direction by the collar 218. It is important to note that the flexible clutch members 214 may extend in both the Y-axis and the Z-axis, and that as the flexible clutch members 214 extend in the −Z direction, the flexible clutch members 214 also retract radially inward along the Y-axis.

Referring still to FIG. 4B, the brake pads 215 are in a disengaged state, where the brake pads 215 are not contacting the rollers 204, and the flexible clutch member 214 contacting the ground is retracted radially inward along the Y-axis and biased in the −Z direction by the hinged collar portion 219. As the hinged collar portion 219 is actuated by the actuator 220 in the −Z direction, the flexible clutch member 214 contacting the ground is also biased in the −Z direction. Since the brake pads 215 are secured to the flexible clutch members 214, the brake pads 215 of the flexible clutch members 214 of the rollers 204 touching the ground also are retracted in the radial direction along the Y-axis. In some embodiments, a gap may form between the rollers 204 and the brake pads 215 as the omni-wheel 200 rotates in the longitudinal direction (i.e., X-Y plane) and the rollers 204 contact the ground since the hinged collar portion 219 is arranged to interact with the flexible clutch members 214 of corresponding rollers 204 contacting the ground. As the rollers 204 rotate in the X-Y plane and eventually contact the ground, the corresponding flexible clutch member 214 abuts against the hinged collar portion 219 in the retracted state, moving the flexible clutch member 214 in the −Z direction, allowing the corresponding roller 204 to rotate. Additionally, in some embodiments, a gap may not form between the rollers 204 contacting the ground and the brake pads 215. However, the friction force between the rollers 204 and the brake pads 215 may be reduced, which would allow for rotation of the rollers 204 while still in near contact with the brake pads 215.

Still referring to FIGS. 4A and 4B, the actuator 220 may be actuated by a user (not shown), and may be a mechanical, pneumatic, or electrical actuator. As depicted in FIGS. 4A and 4B, the actuator 220 is laterally offset from the hub in the −Z direction and connected to the hinged collar portion 219 via the actuator arm 222. However, in some embodiments, the actuator 220 and actuator arm 222 may be arranged within the hub of the omni-wheel 200, or the actuator 220 may be directly connected to the hinged collar portion 219.

Figure 5:
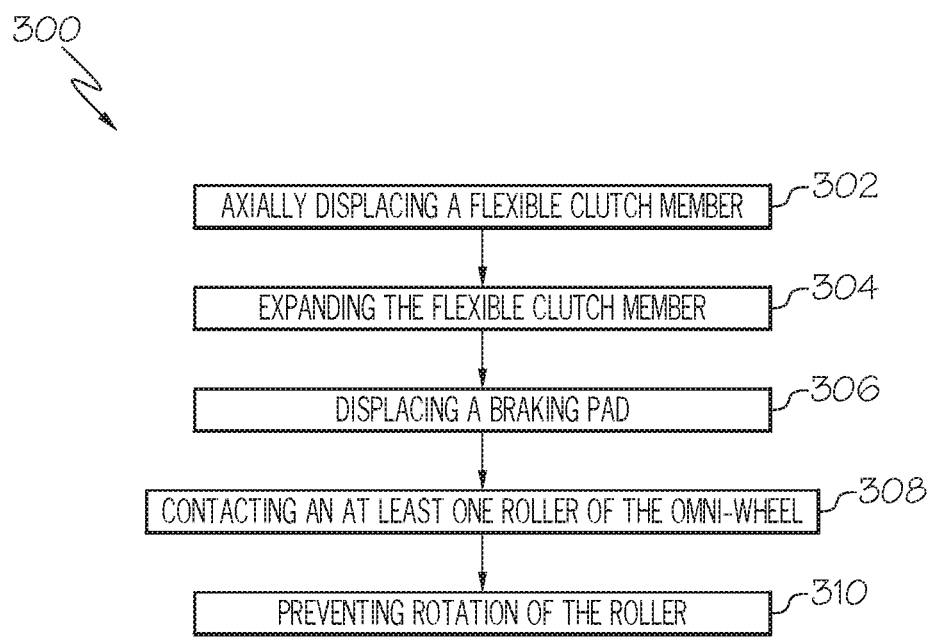
FIG. 5 depicts a method of using a braking device for an omni-wheel, according to one or more embodiments shown or described herein.

Referring now to FIG. 5, a flow chart depicting a method 300 for operating the braking device of the omni-wheel 100 (as illustrated in FIGS. 3A-4B) is depicted. It is noted that while a number of steps are shown in a specific order, embodiments may include a greater or fewer number of steps in varying orders without departing from the scope of the present disclosure. To begin, at step 302 the method 300 may include axially displacing a flexible clutch member 114 arranged within a hub 102 of the omni-wheel 100 in a first axial direction (i.e., the +Z direction). For example, and with reference to FIGS. 3A and 3B, a collar 118 may be arranged on the shaft 108 of the omni-wheel 100, with the flexible clutch members 114 abutting the collar 118. As the collar 118 is displaced by the actuator 120 in the +Z direction, the flexible clutch members 114 may also be displaced in the +Z direction.

Referring again to FIG. 5, step 304 may include expanding the flexible clutch members 114 radially outward in the radial direction RD (i.e., the Y-axis). For example, and with reference to FIGS. 3A and 3B, the displacement of the flexible clutch members 114 in the +Z direction forces the flexible clutch members 114 to be displaced radially outward in along the Y-axis. In some embodiments, the amount of flexible clutch members 114 may equal the amount of rollers 104 arranged on the omni-wheel 100, or there may be a single flexible clutch member 114.

Referring again to FIG. 5, step 306 may include displacing a brake pad 115 arranged within the hub 102 radially outward in the radial direction RD along the Y-axis. For example, and with reference to FIGS. 3A and 3B, the brake pads 115 are arranged on the ends of the flexible clutch members 114 and contact the rollers 104. In some embodiments, the brake pads 115 are integral with the flexible clutch members 114, or may be a different material secured to the flexible clutch members 114.

Referring again to FIG. 5, step 308 may include contacting at least one roller 104 of the omni-wheel 100 with the brake pad 115. For example, and with reference to FIGS. 3A and 3B, the brake pads 115 directly contact the outer surfaces of the rollers 104 and prevent rotation of the rollers 104 in the lateral direction (i.e., Z-axis) through a friction force imparted to the rollers 104 from the brake pads 115. In some embodiments, the brake pads 115 may contact the axles 110, which secure the rollers 104 to adjacent roller mounts 106, in order to prevent rotation of the rollers 104.

Referring again to FIG. 5, step 310 may include preventing rotation of the roller 104 due to the contact between the brake pad 115 and the roller 104. For example, and with reference to FIGS. 3A and 3B, the brake pads 115 are secured to the flexible clutch members 114, and are displaced in the outward radial direction RD in order to contact the rollers 104. In some embodiments, the collar 118, which displaces the flexible clutch members 114 and brake pads 115, remains in an axially displaced position in order to hold the brake pads 115 in contact with the rollers 104 to prevent rotation of the rollers 104.

It should now be understood that embodiments described herein are directed to omni-wheels having a braking device arranged therein. The omni-wheel may include a shaft, a plurality of rollers, and the braking device to selectively brake the rollers. The plurality of rollers may be circumferentially arranged about the shaft and arranged radially outward from the shaft to allow the omni-wheel to function as a traditional wheel. The braking device may include at least one flexible clutch member, at least one brake pad, and an actuator to transition the flexible clutch member between an engaged and disengaged state. The at least one brake pad may be arranged on the flexible clutch member. The flexible clutch member may expand radially outward when axially displaced by the actuator, which may displace the at least one brake pad arranged on the flexible clutch member radially outward to contact at least one of the plurality of rollers, preventing rotation of the roller in the lateral direction.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. An omni-wheel, comprising:
   a shaft;
   a plurality of rollers circumferentially arranged about the shaft and arranged radially outward from the shaft;
   a braking device, comprising:
      an at least one flexible clutch member arranged about the shaft, the at least one flexible clutch member having an outer diameter;
      an at least one brake pad arranged on the outer diameter of the at least one flexible clutch member; and
      an actuator arranged to axially displace the at least one flexible clutch member;
      wherein the at least one flexible clutch member expands radially outward when axially displaced by the actuator, displacing the at least one brake pad arranged on the outer diameter of the at least one flexible clutch member radially outward to contact at least one of the plurality of rollers, thereby preventing rotation of the roller.

2. The omni-wheel of claim 1, wherein the at least one brake pad is secured to the at least one flexible clutch member.

3. The omni-wheel of claim 1, wherein the at least one brake pad is integral with the at least one flexible clutch member.

4. The omni-wheel of claim 1, wherein the at least one brake pad is biased radially inward to disengage the at least one roller when the at least one flexible clutch member is not axially displaced.

5. The omni-wheel of claim 1, wherein the actuator further comprises a collar arranged on the shaft of the omni-wheel.

6. The omni-wheel of claim 5, wherein the at least one flexible clutch member is arranged within a channel formed on the shaft of the omni-wheel.

7. The omni-wheel of claim 1, wherein the at least one brake pad contacts an axle of the least one of the plurality of rollers.

8. The omni-wheel of claim 1, wherein the at least one brake pad only prevents rotation of the roller contacting the ground.

9. A braking device for an omni-wheel, comprising:
   a flexible clutch member arranged about a shaft of an omni-wheel, wherein the flexible clutch member is radially aligned with a roller of the omni-wheel;
   a brake pad arranged on the flexible clutch member; and
   an actuator arranged to axially displace the flexible clutch member;
   wherein the flexible clutch member expands radially outward when axially displaced by the actuator, displacing the brake pad arranged on the flexible clutch member radially outward to contact the roller, preventing rotation of the roller.

10. The braking device of claim 9, wherein the brake pad is secured to the flexible clutch member.

11. The braking device of claim 9, wherein the brake pad is integral with the flexible clutch member.

12. The braking device of claim 9, wherein the brake pad is biased radially inward to disengage the roller when the flexible clutch member is axially displaced.

13. The braking device of claim 9, wherein the actuator further comprises a collar arranged on the shaft of the omni-wheel.

14. The braking device of claim 13, wherein the flexible clutch member is arranged within a channel formed within the shaft of the omni-wheel.

15. A method of braking an omni-wheel, the method comprising:
   axially displacing a flexible clutch member arranged within a hub of the omni-wheel in a first axial direction; and
   expanding the flexible clutch member radially outward to displace a brake pad arranged within the hub radially outward in order to contact an at least one roller of the omni-wheel with the brake pad, thereby preventing rotation of the roller.

16. The method of claim 15, wherein the at least one roller of the omni-wheel is prevented from rotating only when contacting the ground.

17. The method of claim 15, wherein the brake pad is integral with an outer diameter of the flexible clutch member.

18. The method of claim 15, wherein the flexible clutch member is arranged within a channel formed within a shaft of the omni-wheel.

19. The method of claim 15, further comprising:
axially displacing a flexible clutch member arranged within a hub of the omni-wheel in a second axial direction; and
retracting the flexible clutch member radially inward to displace the brake pad arranged within the hub radially inward, in order to disengage the brake pad with the at least one roller of the omni-wheel.

20. The method of claim 15, wherein the brake pad is biased radially inward to disengage the at least one roller when flexible clutch member is axially displaced in the second axial direction.

* * * * *